United States Patent [19]

Makino

[11] Patent Number: 5,726,926
[45] Date of Patent: Mar. 10, 1998

[54] SHIFTER FOR SHIFTING FLOATING POINT NUMBER UTILIZING ARITHMETIC OPERATION OF REDUNDANT BINARY NUMBER, AND ADDER CONTAINING THE SAME

[75] Inventor: Hiroshi Makino, Hyogo, Japan

[73] Assignee: Mitsubishi Denki Kabushiki Kaisha, Tokyo, Japan

[21] Appl. No.: 548,117

[22] Filed: Oct. 25, 1995

[30] Foreign Application Priority Data

Dec. 5, 1994 [JP] Japan ................... 6-300728

[51] Int. Cl.⁶ ................. G06F 7/00; G06F 7/38
[52] U.S. Cl. .................... 364/748.11; 364/715.08
[58] Field of Search .............. 364/748, 715.08, 364/748.01, 748.11

[56] References Cited

U.S. PATENT DOCUMENTS

| | | | |
|---|---|---|---|
| 4,999,800 | 3/1991 | Birger | 364/748 |
| 5,166,898 | 11/1992 | Ishihara | 364/748 |
| 5,526,296 | 6/1996 | Nakahara et al. | 364/715.08 |
| 5,623,435 | 4/1997 | Takewa et al. | 364/764 |

OTHER PUBLICATIONS

Fuyuki Okamoto et al, A 200-MFLOPS 100-MHz 64-b BiCMOS Vector-Pipelined Processor (VPP) ULSI, IEEE, Journal of Solid-State Circuits, vol. 26, No. 12, Dec. 1991, pp. 1885-1893.

Hiroshige Fujii et al, A Floating-Point Cell Library and a 100-MFLOPS Image Signal Processor, IEEE, Journal of Solid-State Circuits, vol. 27, No. 7, Jul. 1992, pp. 1080-1088.

Akira Katsuno et al, A 64-bit Floating-Point Processing Unit with a Horizontal Instruction Code for Parallel Operations, IEEE, 1990, pp. 347-350.

*Primary Examiner*—Reba I. Elmore
*Assistant Examiner*—Robert J. Dolan
*Attorney, Agent, or Firm*—Lowe, Price, LeBlanc & Becker

[57] ABSTRACT

Difference between exponents of first and second numbers, based on which an amount of shifting is determined, is represented as a redundant binary number. For groups of bit data pairs of mutually corresponding digits, one shifting means is provided. Each shifting means includes shifting means having fixed amount of bits for shifting corresponding to the amount of shifting represented by the group of input bit data pairs. When a group of bit data pairs is input, one shifting means having fixed amount of bits for shifting of the shifting means is selected, and input number is shifted. By serially connecting the shifting means having such a structure, the first input binary number is successively shifted, and a result shifted by the desired amount is output.

10 Claims, 12 Drawing Sheets

```
   1  0  1  0  0  0  1  0     : EA

-  0  1  1  1  1  0  1  1    : EB
   ─────────────────────────
   1 -1  0 -1 -1  0  0 -1     : EA-EB
```

SHIFTER FOR SHIFTING FLOATING POINT NUMBER UTILIZING ARITHMETIC OPERATION OF REDUNDANT BINARY NUMBER, AND ADDER CONTAINING THE SAME

BACKGROUND OF THE INVENTION

1. Field of the Invention

The present invention relates to a shifter for shifting a number in a computer, based on a difference between two other numbers. More specifically, it relates to increase in speed of adjusting position of digits when two other floating point numbers are added.

2. Description of the Background Art

In various numerical calculations mainly in the field of scientific and technical computation, various calculations using floating point are performed. Addition of floating point number is one of said calculations which is most frequently performed.

Therefore, when increase of the speed of operation of the numerical calculation system as a whole is contemplated, increase in speed of addition of floating point numbers is very effective.

Conventionally, addition of floating point numbers has been executed by such a circuit as shown by the block diagram of FIG. 12, for example. This is the circuit disclosed in F. Okamoto et al. "200-MFLOPS 100 MHz 64-b BidCMOS Vector-Pipelined Processor (VPP) ULSI," *Journal of Solid-State Circuits*, Vol. 26, No. 12, December 1991, p. 1887, FIG. 2.

Prior to the description of the flow of addition of floating point numbers shown in FIG. 12, data structure of the floating point number will be described with reference to FIG. 13.

As shown in FIG. 13, generally, a floating point number consist of a sign, an exponent and a mantissa, and according to IEEE standard, for example, the data structure is specified in the following manner. Namely, when the data is of single precision having 32 bit width, 1 bit corresponds to the sign bit, 8 bits correspond to the exponent and 23 bits correspond to the mantissa, from the most significant bit. When the data is of double precision having 64 bit width, 1 bit corresponds to the sign bit, 11 bits correspond to the exponent and 52 bits correspond to the mantissa, from the most significant bit.

According to this standard, when we represent the sign bit by S, the exponent by E and mantissa by K, a value V will be expressed as:

$$V = (-1)^S \times (1.K) \times 2^{(E-n)} \quad (1)$$

where n is a biasing value added for convenience to the exponent, which is 1111111 in binary notation for single precision data, and it is 1111111111 in binary notation for double precision data.

The operation of a circuit for adding floating point numbers will be described. Floating point numbers 1 and 2 as inputs are represented in accordance with the equation (1). Therefore, for addition, first the values of exponents must be compared and positions of digits must be adjusted accordingly.

Referring to FIG. 12, a shift control signal generating circuit 101 for position adjustment generates a shift control signal for position adjustment, using a result of subtraction of the exponents of floating point numbers 1 and 2.

More specifically, an exponent subtractor 3 receives as inputs data 7 and 9 of the exponents of floating point numbers 1 and 2, subtracts exponent data 9 from exponent data 7, and outputs an absolute value signal 11a indicative of the absolute value of the difference therebetween and a carry output signal 11c corresponding to the positive/negative sign of the result.

A swapper 4 receives data 8 and 10 of the mantissa of floating point numbers 1 and 2. In accordance with the value of carry output signal 11c, swapper 4 outputs mantissa data 8 or 10 which corresponds to the smaller of exponent data 7 and 9, to a right barrel shifter 5, which will be described later, and outputs mantissa data corresponding to the larger of the exponent data values to a mantissa adder 6, which will be described later.

Right barrel shifter 5 receives as input the mantissa data 8 or 9 selected by swapper 4, and amount of shifting of which is controlled by the value of the signal 11a indicative of the absolute value of the difference between exponent data.

Mantissa adder 6 receives as inputs the output from right barrel shifter 5 and mantissa data 8 or 9 selected by swapper 4, and adds these data.

More specifically, when an arithmetic operation of floating point numbers is performed, generally, positions of the mantissa are aligned in accordance with the larger one of the value of the exponents of two data to be operated, and therefore difference between the exponents must be calculated and the mantissa of the data of which exponent is smaller must be shifted by the calculated difference.

This processing is generally referred to as shifting for position adjustment, and in order to obtain a control signal for shifting, the difference between exponents must be obtained in terms of an absolute value.

Shifting for position adjustment will be described in greater detail in the following.

Exponent data 7 and 9 are input to subtractor 3, and exponent data 9 is subtracted from exponent data 7. Here, if the value of exponent data 7 is larger than the value of exponent data 9, carry output signal 11c attains to the H level, and if the value of exponent data 9 is equal to or larger than the value of exponent data 7, carry output signal 11c attains to an L level.

More specifically, if the carry output signal 11c is at the H level, the result of subtraction has a positive value, and if the carry output signal 11c is at the L level, the result of subtraction has a negative value.

In exponent subtractor 3 of FIG. 12, there is a circuit for performing 2's complement operation when the result of subtraction is negative, and by this circuit, even when the carry output signal 11c is at the L level, an absolute value signal 11a is provided.

Here, the 2's complement operation means inverting every bit of data and adding 1, which corresponds in an arithmetic operation circuit, inversion of a sign of a binary number.

If the result of subtraction is positive, it is directly output as the absolute value signal 11a. The absolute value signal 11a represents the amount of shifting for position adjustment of the mantissa, which value is input to right barrel shifter 5, and shifting for position adjustment is performed.

As for mantissa data 8 and 10, if the value of carry output signal 11c is at the L level, mantissa data 8 is input to right barrel shifter 5, and if the value of carry output signal 11c is at the H level, mantissa data 10 is input to right barrel shifter 5.

More specifically, mantissa data 8 or 10 of which exponent data 7 or 9 is smaller is input to the right barrel shifter 5. Right barrel shifter 5 performs shifting for position adjustment, in accordance with the amount of shifting indicated by the absolute value signal 11a of the difference between exponent data 7 and 9. After position adjustment is completed by the above described process, mantissa data is input to adder 6 and arithmetic operation is carried out.

The conventional adder for floating point number has such a structure as described above, and accordingly, it suffers from the following problems.

More specifically, swapping of the mantissa by swapper 4 and shifting by right barrel shifter 5 are not possible until the value of output 11 from exponent subtractor 3 is determined.

The operation of exponent subtractor 3 will be described in greater detail in the following.

There are two methods of subtraction of binary numbers, that is, a method in which a subtrahend is subtracted from a minuend and a borrowing from neighboring higher digit, and a method utilizing addition of complements.

In the following, the latter method will be discussed, since addition of complements is performed in most computers, as it can be implemented based on similar concept as an adder circuit.

FIG. 14 is a schematic block diagram showing a structure of a common parallel adder. For simplicity, addition of data including 5 bits (where addition of complements corresponds to subtraction) will be described.

Respective digits of data bits of augend A ($=A_4 A_3 A_2 A_1 A_0$) and of an addend B ($=B_4 B_3 B_2 B_1 B_0$) are input to corresponding full adders $FA_i$ (i=4, 3, 2, 1, 0). For the addition of the least significant bits, 0 is input as an initial value of a carry signal, and data $A_0$ and $B_0$ are input as data for addition. Result of addition $S_0$ and a carry signal $C_1$ are output.

At a digit higher by one, $A_1$, $B_1$ and $C_1$ are received as inputs, and a result of addition $S_1$ and carry signal $C_2$ are output. Thereafter, arithmetic operations of respective bits are performed successively. However, the result of operation is not established until the carry signal is propagated to the most significant bit.

Therefore, because of this delay in carry signal propagation, establishment of control signals for the swapper 4 and for the right barrel shifter 5 is also delayed.

In order to increase the speed of operation, a carry look-ahead circuit has been proposed.

The principal of this circuit will be briefly described.

Now, assume that ith bits of the augend and the addend are $A_i$, $B_i$ and when $$A_i \cdot B_i = 1 \quad (2)$$

then a carry signal $C_{i-1}=1$ is generated from the ith bit.

$$\text{If } A_i/B_i + /A_i B_i 1 \quad (3)$$

(/$A_i$, /$B_i$ and so on represent negation of respective logic values), then a carry $C_{i+1}=1$ is generated only if there is a carry $C_i=1$ because of the addition of the i-1th bit. Therefore, in order to propagate a carry signal $C_i$ from a lower digit to an upper digit, the condition of the equation (3) must be satisfied.

However, the carry $C_{i+1}=1$ to the upper digit occurs when the equation (2) is satisfied as well, and it is not necessary to tell the latter carry from the former one. Therefore, the carry $C_i$ from the lower digit may be propagated when it holds:

$$A_i \cdot B_i + (A_i \cdot B_i + /A_i \cdot B_i) = A_i + B_i = 1$$

Here, a carry generation function $G_i$ and a carry propagation function $P_i$ for the ith bit are defined by the following equation.

$$G_i = A_i \cdot B_i \quad (4)$$

$$P_i = A_i + B_i \quad (5)$$

When these two functions are used, a carry signal $C_{i+1}$ for the ith bit is given by:

$$C_{i+1} = G_i + P_i \cdot C_i \quad (6)$$

where $C_i$ represents an external carry input, which may be 0 for addition.

From the equation (6), we obtain $$\begin{aligned}
C_{i+1} &= G_i + P_i \cdot C_i \\
&= G_i + P_i \cdot (G_{i-1} + P_{i-1} \cdot C_{i-1}) \\
&= G_i + P_i \cdot (G_{i-1} + P_i \cdot P_{i-1} \cdot G_{i-2} + \ldots P_i \cdot \\
&\quad P_{i-1} \ldots P_0 G_0 + P_i \cdot P_{i-1} \ldots P_0 \cdot C0
\end{aligned} \quad (7)$$

More specifically, the carry $C_{i+1}$ for the ith bit is calculated in accordance with $$G_k (k=0 \text{ to } i) \quad (8)$$

$$P_k (k=0 \text{ to } i) \quad (9)$$

where $G_k$ (k=0 to i) and $P_k$ (k=0 to i) are calculated in accordance with equations (4) and (5) from the inputs to the ith bit.

At this time, a sum $S_i$ is given by $$S_i = A_i * B_i * C_i \quad (10)$$

(where * represents an exclusive OR).

FIG. 15 is a block diagram of a carry-look ahead type adder of 4 bits utilizing the above described operation procedure.

First, augend and addend A ($=A_3 A_2 A_1 A_0$) and B ($=B_3 B_2 B_1 B_0$) are input to an adder, and AND and OR are calculated for every corresponding bit data. Thus, the carry generation function $G_i$ and the carry propagation function $P_i$ of respective bits are simultaneously established.

Then, by performing arithmetic operation of respective digits independent from each other, that is, completely parallel to each other, results of addition of respective digits are obtained.

At the first digit, the augend and the addend are input, and based on $C_0$, $P_0$, $G_0$ and $A_1$, $B_1$ which have been already established, a result of addition $S_1$ is established. Therefore, results of addition of respective digits are established without the necessity to wait for the result of operation of lower digits.

In other words, the speed of subtraction is increased since there is not a carry propagation delay. However, in this approach also, exponent subtractor 3 (including a circuit for generating complements) and a swapper 4 are necessary and time delay incidental thereto is unavoidable. In addition, this approach increases the amount of hardware and makes longer the speed of operation.

SUMMARY OF THE INVENTION

An object of the present invention is to provide a shifter for position adjustment which avoids subtraction, simplifies circuit structure and enables higher speed of operation, by performing subtraction utilizing redundant binary numbers.

Another object of the present invention is to provide a floating point number adder which allows high speed arithmetic operation, utilizing the aforementioned shifter for position adjustment.

Briefly stated, the present invention contemplates a shifter for arithmetic operation of first to fourth binary numbers, having a function of shifting either a third or fourth number in accordance with a difference obtained by subtraction of a second number from the first number, which shifter includes first to fourth storing circuits and a plurality of shift circuits connected in series to each other. The first to fourth storing circuits store the first to fourth numbers respectively. The plurality of shift circuits receive, as an input, either the third or fourth number, and shift the number successively. Each shift circuit includes: a first input end to which a number to be shifted is input; a second input end to which at least a pair of bit data of mutually corresponding digits of the first and second numbers are input; a plurality of shift circuits of which amount of bits for shifting are fixed, selected in accordance with data input to the second input end, and each having an amount of shift represented by a group of bit data pairs input to the second input end when the difference between each of the bit data pair is regarded as a redundant binary number; and an output end for outputting a result of shifting of the value input from the first input, by the selected one of the shift circuits having fixed amount of bits for shifting.

The shifter in accordance with another aspect of the present invention is for first to fourth numbers represented in binary notation, having a function of shifting either the third or fourth number based on a difference obtained by subtraction of the second number from the first number, the shifter including first to fourth storing circuits and a plurality of shift circuits connected in series to each other. The first to fourth storing circuits store the first to fourth numbers, respectively. The plurality of shift circuits receive either the third or fourth number as an input, and shift the received number successively. Each shift circuit includes: a first input end to which a number to be shifted is input; a second input end to which a value corresponding to the amount of shifting is input; an encoding circuit receiving at least two pairs of bit data of corresponding digits of the first and second numbers, for encoding an amount of shift represented by the difference between the pairs of bit data when the difference is regarded as a redundant binary number; a shift circuit having fixed amount of bits for shifting corresponding to the amount of shifting which may be generated by the encoding circuit; and an output end for outputting a result of shifting of the number input through the first input end by the circuit having fixed amount of bits for shifting by the encoding circuit.

The shifter in accordance with still another aspect of the present invention is for first to fourth number represented by binary notation, having a function of shifting the third and fourth numbers in accordance with a difference obtained by subtracting the second number from the first number, the shifter including first to fourth storing circuits, a bit data distributing circuits, and first and second groups of shift circuits.

The first to fourth storing circuits store the first to fourth numbers. The bit data distributing circuit distributes pairs of bit data of corresponding digits of the first and second numbers to first and second groups of bit data pairs. The first group of the shift circuits includes a plurality of serially connected shift circuits receiving the third number as an input and shifting the number successively. Each of the shift circuits of the first group includes: a first input end to which the number to be shifted is input; a second input end to which one subgroup of the groups of the bit data pairs is input; a shift circuit having a fixed amount of bits for shifting for each pair of bit data input to the second input end, corresponding to the amount of shift represented by the subgroup when the difference between the pair is regarded as redundant binary number, performing shifting of digits in a first direction when the amount of shifting is positive and to a second direction when the amount of shifting is negative; and an output end for outputting result of shifting of the number input to the first input, by one of the shift circuits selected corresponding to the data input to the second input. The second group of shift circuits includes a plurality of serially connected shift circuits receiving the fourth number as an input and shifts the number successively. Each of the shift circuits of the second group receives one subgroup of the second group of bit data pairs, and the second group of shift circuits have the sign (positive/negative) of the amount of shifting and the direction of shifting reversed to those of the first group of shift circuits.

Therefore, a major advantage of the present invention is as follows. The difference between the first and second numbers, based on which the amount of shifting is determined, is regarded as a redundant binary number. Therefore, arithmetic operation may be performed for respective digits independent from each other, and hence a control signal for the shift amount can be established without propagation delay of a carry signal. Further, each of a plurality of serially connected shift circuits is provided with a shift circuit having fixed amount of bits for shifting, which respectively correspond to the amounts of shifting represented by the groups of bit data pairs input thereto. As a result, the path of successive shifting of the input number by respective shift circuits is determined at one time when the bit data of the first and second numbers are input.

Therefore, position adjustment can be performed directly from the first and second numbers without performing subtraction between the first and second numbers, which realizes very fast shifting operation.

Another advantage of the present invention is as follows. The difference between the first and second numbers is distributed to at least two groups. Pairs of bit data of the first and second numbers belonging to respective groups are encoded and then input to shift circuits corresponding to respective groups. Therefore, the number of stages of bidirectional shifters can be reduced, and higher speed of shifting operation can be realized.

An additional advantage of the present invention is as follows. The difference between the first and second numbers is regarded as a redundant binary number and divide into two groups of bit data. By a first group of shift circuits serially connected to each other and corresponding to a group of bit data of respective digits of the first redundant binary number thus distributed, a third number is shifted successively.

By a second group of shift circuits connected in series to each other and corresponding to the group of bit data of respective digits of the second redundant binary number thus distributed, which shift circuits have the sign (positive/negative) of the redundant binary number and the direction of shifting reverse from those of the shift circuits of the first group, a fourth number is shifted successively. As the third and fourth numbers are mutually shifted by the above described structure, shifting operation is performed simultaneously with the total amount of shifting divided into two, the number of stages of the bidirectional shifters can further be reduced, and the speed of position adjustment for shifting can further be increased.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figures 1, 2:
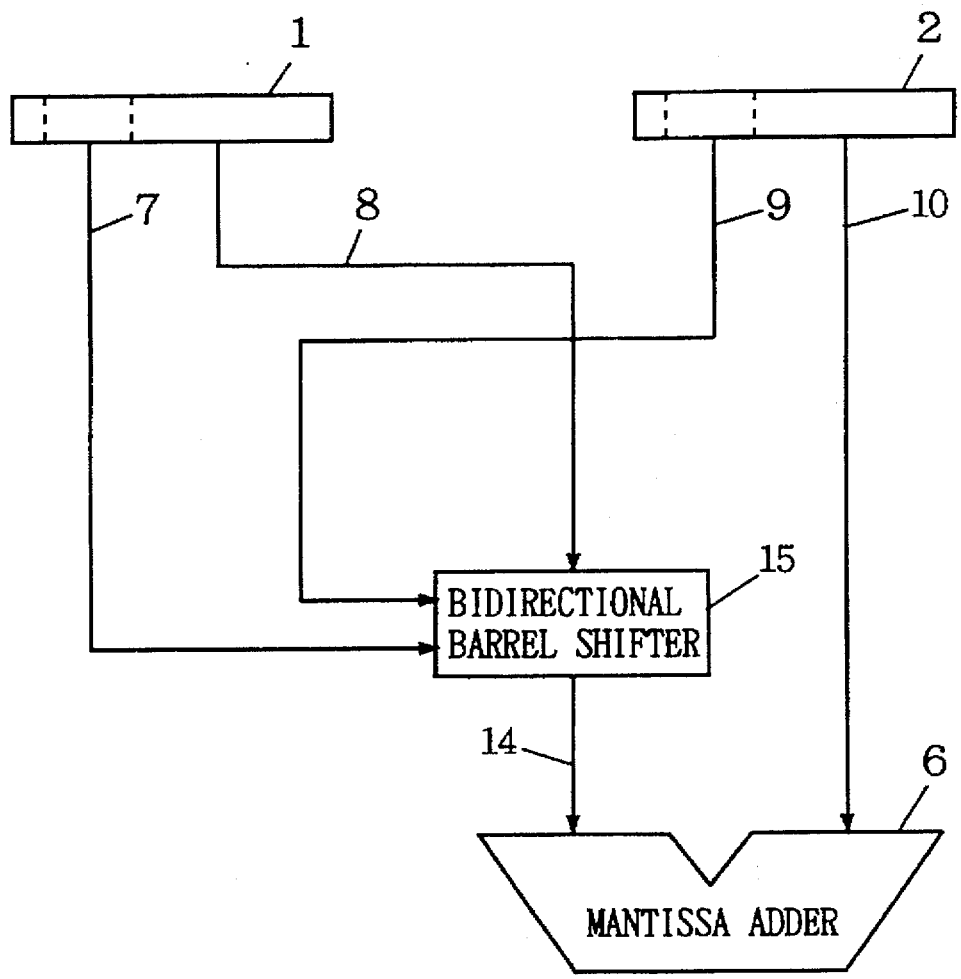
FIG. 1 shows a structure of a shifter in accordance with a first embodiment of the present invention.
FIG. 2 is a representation of subtraction by redundant binary notation.

FIG. 1 is a schematic block diagram showing a first embodiment of the present invention.

Referring to FIG. 1, a bidirectional barrel shifter performs shifting of mantissa 8 of a floating point number 1 in both the left and right directions based on two inputs, that is, exponents 7 and 9 of floating point numbers 1 and 2. Other portions are the same as those of the prior art example.

The operation of the bidirectional barrel shifter will be described. In the following, first, arithmetic operation of redundant binary numbers which is one of mathematical principle based on which the bidirectional barrel shifter 15 operates, will be described. A hardware structure for actually performing digit shifting based on the principle follows. As will be apparent from the following description, by representing a difference between binary numbers in redundant binary notation, an arithmetic operation for finding a difference is replaced by an operation of comparing magnitude of bit data at respective digits.

As a result, hardware implementing the procedure can be significantly simplified.

The exponents 7 and 9 of floating point numbers 1 and 2 are represented as 8 bits of data $E_A$ and $E_B$ as follows.

$$E_A = a_7\ a_6\ a_5\ a_4\ a_3\ a_2\ a_0 \tag{11}$$

$$E_B = b_7\ b_6\ b_5\ b_4\ b_3\ b_2\ b_0 \tag{12}$$

Shifting for position adjustment is performed based on the value $E_A - E_B$. If this value is negative, it means that the floating point number 1 is smaller than the floating point number 2, and therefore 8, which is the addend of floating point number 1 is shifted to the right, and when $E_A - E_B$ is positive, it must be shifted to the left. The amount of shifting is the absolute value of $E_A - E_B$. This shift can be represented in extremely simple manner when a so-called redundant binary representation is used, in which each digit is represented by three values, that is, $-1$, 0 or 1.

Assume that $E_A = 10100010$ and $E_B = 01111011$. Then $E_A - E_B$ is simply represented as $1-10-1-100-1$ by the subtraction of bits of the corresponding digits, as shown in FIG. 2. More specifically, when these numbers are represented in decimal notation, $$E_A = a \cdot 2^7 + 0 \cdot 2^6 + 1 \cdot 2^5 + 0 \cdot 2^4 + 0 \cdot 2^3 + 0 \cdot 2^2 + 1 \cdot 2^1 + 0 \cdot 2^0 = 162$$

$$E_B = 0 \cdot 2^7 + 1 \cdot 2^6 + 1 \cdot 2^5 + 1 \cdot 2^4 + 1 \cdot 2^3 + 0 \cdot 2^2 + 1 \cdot 2^1 + 1 \cdot 2^0 = 123$$

$$E_A - E_B = 1 \cdot 2^7 + (-1) \cdot 2^6 + 0 \cdot 2^5 + 0 \cdot 2^5 + (-1) \cdot 2^4 + (-1) \cdot 2^3 + 0 \cdot 2^2 + 0 \cdot 2^1 + (-1) \cdot 2^0 = 39$$

and hence it is found that the redundant binary representation shows the correct value. This $E_A - E_B$ is the amount of shifting.

At this time, as is apparent from the manner of subtraction, propagation of a carry signal does not occur.

Figure 3:
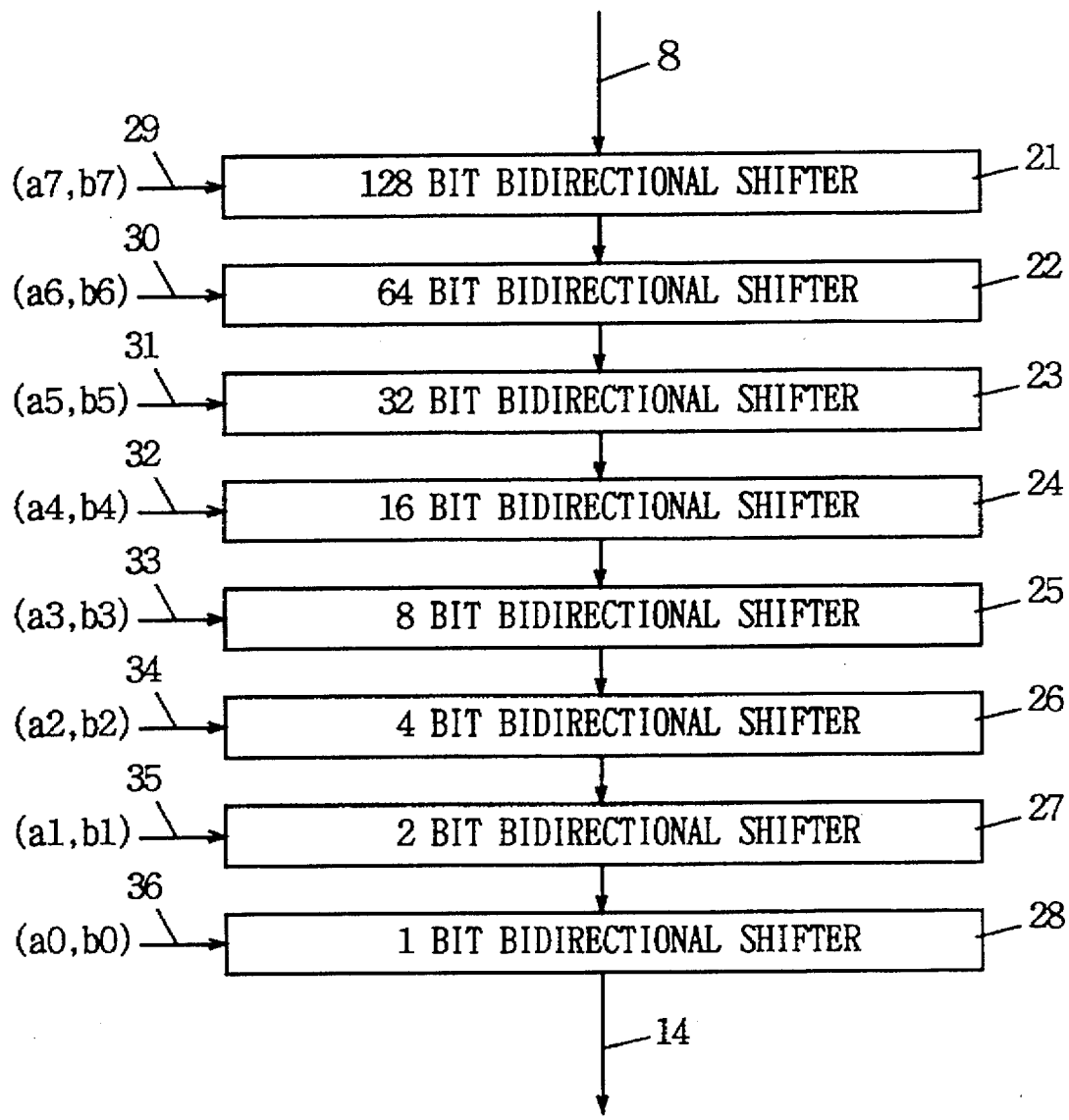
FIG. 3 is a first illustration showing a structure of a bidirectional barrel shifter in accordance with the first embodiment.

One example of a structure of a bidirectional barrel shifter 15 based on this idea is shown in FIG. 3. In the figure, reference characters 21 to 28 denote 128, 64, 32, 16, 8, 4, 2, and 1 bit bidirectional shifters, respectively. Reference characters 29 to 36 denote pairs of corresponding bits of $E_A$ and $E_B$.

Based on the above described idea, the values of each bit pair is defined in the following manner.

$$(a_i, b_i) = a_i - b_i \tag{13}$$

Here, let us consider the 128 bit bidirectional shifter 21. When $(a_7, b_7) = (1, 0)$, this value would be 1 from equation (13). Therefore, the input 8 is shifted in the left by 128 bits. If $(a_7, b_7) = (0, 1)$, this value would be $-1$ from equation (13), and therefore it is shifted to the right by 128 bits. If $(a_7, b_7) = (1, 1)$ or $(a_7, b_7) = (0, 0)$, this value would be 0 from equation (13), and therefore the input 8 is not shifted. The same applies to other seven bidirectional shifters 22 to 28.

By this structure, for arbitrary values $E_A$ and $E_B$, shifting according to the value of difference therebetween can be realized. In the above example, shifting in the left direction by 39 bits is finally realized. In redundant binary notation, a number in decimal notation can be represented in four different manners by using four digits, that is, "0101", "011-1", "1-101" and "1-11-1" Namely, one value may be represented in a plurality of different manners. However, when the bidirectional shifters of these structures are used, one output can be obtained finally, no matter what type of representation is used.

The structures of the bidirectional shifters 21 to 28 will be described in greater detail.

Figure 4:
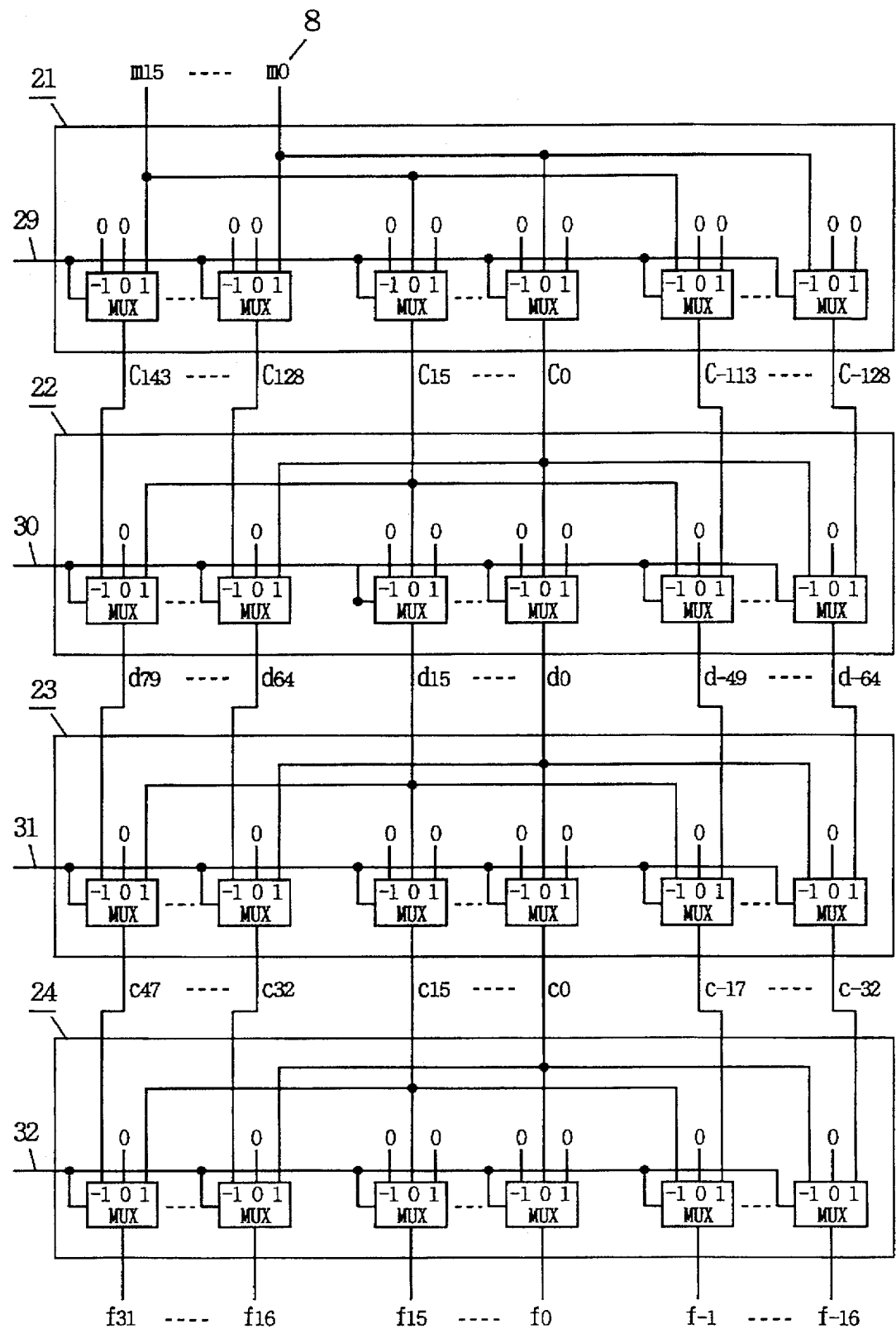
FIG. 4 is a second illustration showing the structure of the bidirectional barrel shifter in accordance with the first embodiment.

FIG. 4 shows the structure of bidirectional shifters 21 to 24 of the bidirectional barrel shifters shown in FIG. 3. Here, it is assumed that the mantissa of the floating point number has the bit width of 16 bits. The data 8 in the figure shows the mantissa $m_{15} \ldots m_0$.

MUX represents a multiplexer having three inputs. Each MUX selects and outputs, to a multiplexer of a next stage in accordance with corresponding values of signals 29 to 32 in redundant binary notation, an input on the left side when the value of the redundant binary number is −1, the middle input when it is 0, and the right input when it is 1.

128 bit left and right bidirectional shifter 21 shifts the input 8 by 128 bits to the right when the value of redundant binary number 29 is −1, and outputs the result as $C_{-113}$ to $C_{-128}$. Here, the suffix represents the position of a digit, and the leftmost one corresponds to the most significant bit. Digits located at the right side with respect to the 0th digit are represented by negative values for convenience.

When the pair 29 of the bit data of redundant binary number is 0, input 8 is not shifted and it is output as $C_{15}$ to $C_O$. If the pair 29 of the bit data of redundant binary number is 1, the input 8 is shifted to the left by 128 bits and output as $C_{143}$ to C128. $C_{127}$ to $C_{16}$ and $C_{-1}$ to $C_{-112}$ are not actually used, and therefore, it is not necessary to provide these in the form of hardware. Therefore, in this example, they are ignored.

Next, 64 bit bidirectional shifter 22 shifts and outputs the input number to the right by 64 bits, when the redundant binary number input 30 is −1. Namely, $C_{143}$ to $C_{128}$ are shifted to $d_{79}$ to $d_{64}$, and $C_{15}$ to $C_O$ are shifted to to $d_{-64}$.

Here, $C_{-113}$ to $C_{-128}$ are also shifted to the right and output as $d_{-177}$ to $d_{-192}$. However, this phenomenon can be ignored by the following reason. More specifically, addition by the mantissa adder 6 is necessary only when the most significant digit of one of the two mantissas 14 and 10 of which positions are aligned is out of the range of the digits possibly taken by the other mantissa. Therefore, if the digits of these mantissas are not in the same range, addition is not necessary and mantissa which is larger may be selected.

Therefore, if the mantissa has 16 digits as in this example, the least significant bit of mantissa 14 after the position is aligned have only to be considered if it is in the range from −15th to +15th digits. Consider $d_{-177}$ to $d_{-192}$. The amount of shifting thereafter corresponds to the sum of redundant binary numbers 31 to 36, which are the values of redundant binary numbers having 6 digits, that is, −63 to 63. Therefore, even when maximum shifting takes place to the left, the amount of shifting is 63 bits and at that time, the least significant bit is −129th digit. This is not between the range of from −15th to +15th digits. Therefore, this case need not be considered, and $d_{-177}$ to $d_{-192}$ need not be output.

When the redundant binary number 30 is 0, the input is not shifted but directly output and if the redundant binary input 30 is 1, it is shifted to the left by 64 bits and output. In these cases also, the final output 14 of which least significant bit is possible within the range of from −15 to +15th digits is taken out, and finally, $d_{79}$ to $d_{64}$, $d_{15}$ to $d_O$ and $d_{-49}$ and $d_{64}$ are output.

32 bidirectional shifter 23 and 16 bit bidirectional shifter 24 operate similarly to 64 bit bidirectional shifter 22, except that the amount of shifting is different. As a result, $f_{31}$ to $f_{-16}$ are obtained.

Figure 5:
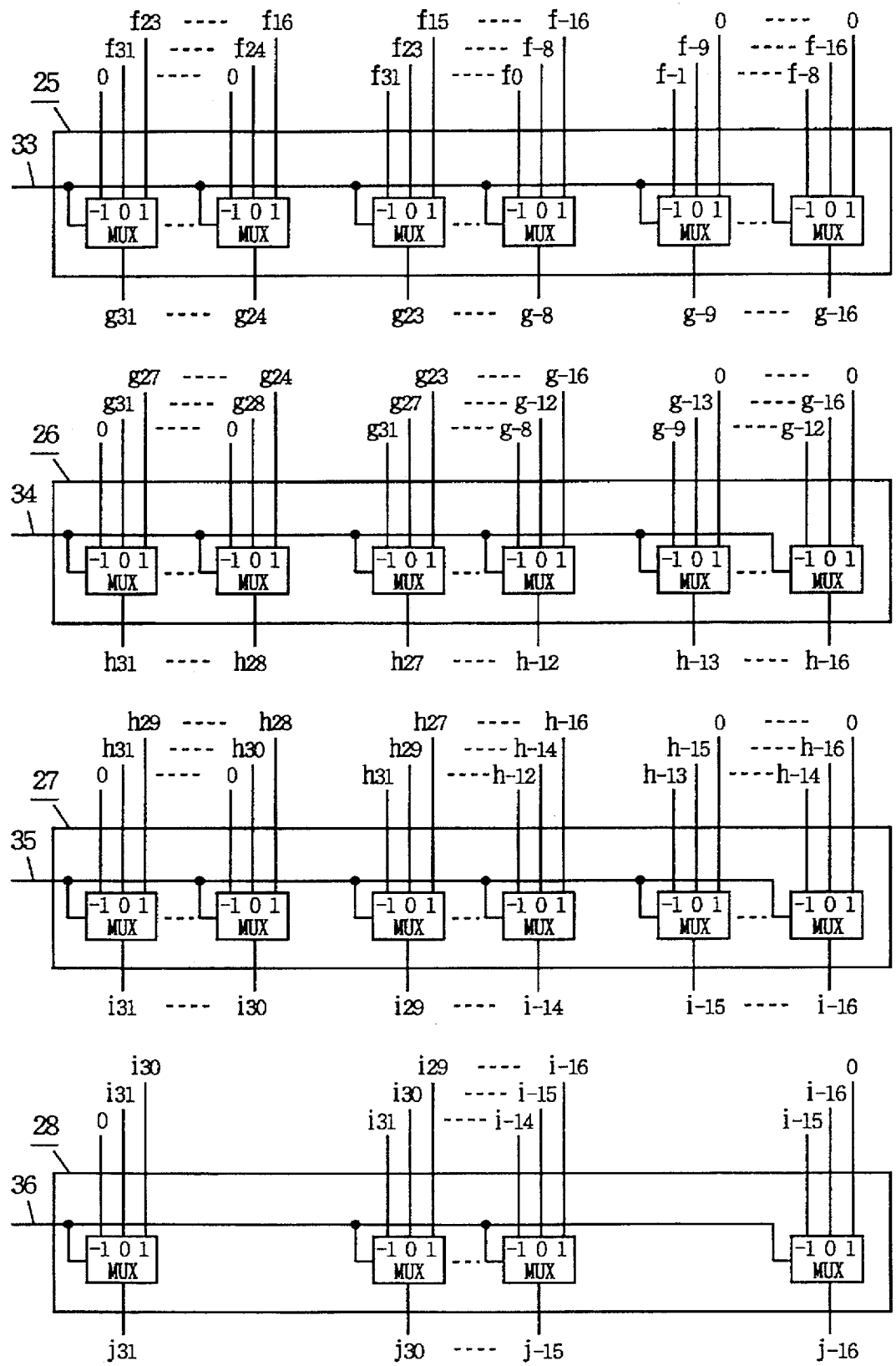
FIG. 5 is a third illustration showing the structure of the bidirectional barrel shifter in accordance with the first embodiment.

FIG. 5 shows the structures of bidirectional shifters 25 to 28 out of the bidirectional barrel shifters shown in FIG. 3.

8 bit directional shifter 25 shifts input number $f_{31}$ to $f_{-16}$ by 8 bit to the right, does not shift at all and shifts by 8 to the left when the redundant binary number 33 is −1, and 1, respectively, and provides the output as $g_{31}$ to $g_{-16}$.

When redundant binary number 34 is −1, 0 and 1, respectively, 4 bit bidirectional shifter 26 shifts input $g_{31}$ to $g_{-16}$ to the right by 4 bits, does not shift, and shifts to the left by 4 bits, and outputs the result to $h_{31}$ to $h_{-16}$.

When redundant binary number 35 is −1, 0 and 1, respectively, 2 bit bidirectional shifter 27 shifts input $h_{31}$ to $h_{-16}$ to the right by 2 bits, not shifts, and shifts to the left by 2 bits, and outputs the result to $i_{31}$ to $i_{-16}$.

When redundant binary number 36 is −1, 0 and 1, respectively, 1 bit bidirectional shifter 28 shifts the inputs $i_{-31}$ to $i16$ to the right by 1 bit, does not shift, and shifts to the left by 1 bit, respectively, and provides the output to $j_{31}$ to $j_{-16}$.

Figure 6:
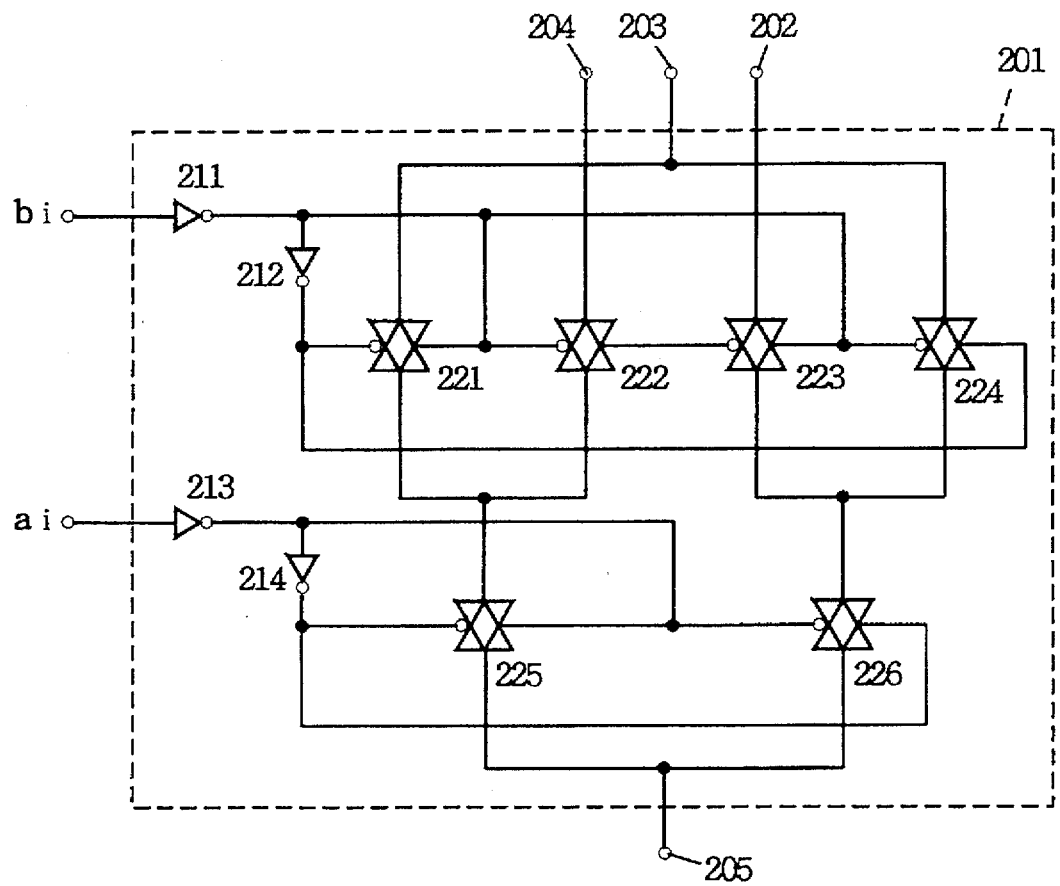
FIG. 6 shows a structure of a multiplexer in the bidirectional barrel shifter.

Though not restricting, an example of a circuit structure of the multiplier (MUX) of FIGS. 4 and 5 is shown in FIG. 6.

Figure 7:
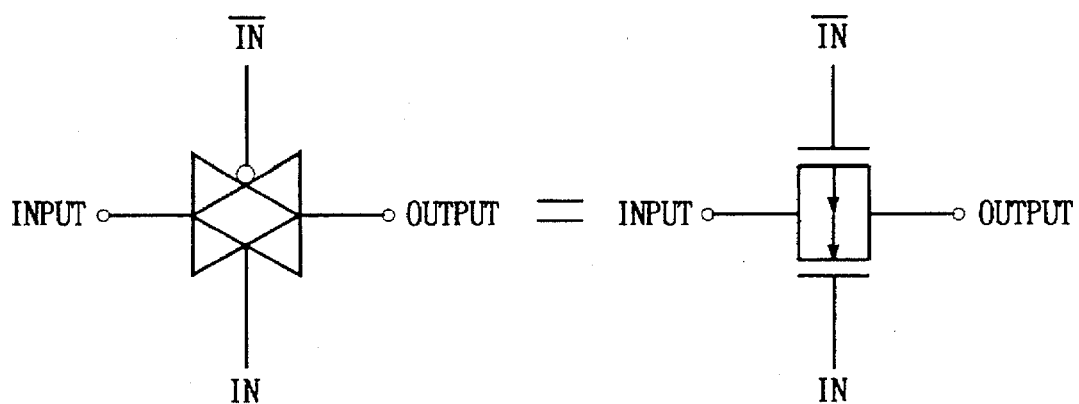
FIG. 7 shows a structure of a transmission gate.

A multiplexer 201 shown in FIG. 6 is a 4 channel multiplexer having CMOS transmission gate shown in FIG. 7 as its basic element.

A transmission gate is formed by connecting in parallel a P channel MOS transistor and an N channel MOS transistor. A signal/IN, which is an inversion of an input signal IN to N channel MOS transistor is input to the gate of P channel MOS transistor. Therefore, when the signal IN is at the H level, the input end and the output end are connected electrically, and when it is at the L level, the input end and the output end are electrically disconnected.

An example in which an input signal $(a_1, b_i)=(1, 0)$ is input to multiplexer 210 will be described. First, the signal $b_i$ is at the L level, and when the signal is inverted by inverters 211 and 212 and input to transmission gates 211 to 214, transmission gates 221 and 223 turn on, while transmission gates 222 and 224 turn off.

Next, as the signal $a_i$ is the H level, when the signal is inverted by inverters 213 and 214 and input to transmission gates 225 and 226, transmission gate 226 turns on and transmission gate 225 turns off.

Namely, of the input ends 202, 203 and 204, only the input end 202 is connected to output end 205.

From the foregoing, when $(a_i, b_i)=(1, 0)$, that is, when the corresponding redundant binary number is 1, the right side path 202 is selected.

In the similar manner, when $(a_i, b_i)=(0, 1)$, the left side path 204 is selected, and when $(a_i, b_i)=(0, 0)$ or when $(a_i, b_i)=(1, 1)$, the middle path 203 is selected. Namely, path corresponding to the redundant binary number −1 or 0 is selected.

Therefore, when the multiplexer structured as described above is positioned in 128 bit bidirectional shifter 21 as shown in FIG. 4, the input signals $m_{15} \ldots m_O$ are output as having been subjected to shifting of +128 bits, 0 bit or −128 bits, in accordance with the input signal $(a_7, b_7)$, without special subtracting operation.

The same applies to other bidirectional shifters 22 to 28.

More specifically, at the time when the pairs of bit data $\{(a_7, b_7), (a_6, b_6), \ldots, (a_0, b_0)\}$ of exponent data 7 and 9 of floating point numbers 1 and 2 are input to the bidirectional barrel shifter 15, signal transmission path for each of the bidirectional shifters 21 to 28 is determined.

Therefore, the path connecting the input 8 and the output 14 of FIG. 3 is determined at one time by the pairs of data $\{(a_7, b_7), (a_6, b_6), \ldots, (a_0, b_0)\}$ which are input in parallel.

The delay time until the input data 8 is shifted and the result is output is only the delay time corresponding to the transition of the multiplexer in each of the bidirectional shifters from the initial state to the state selected by the pair of input bit data (which transition takes place simultaneously in parallel for respective digits), and the time of propagation of the input signal through respective shifters.

As a result, as compared with the conventional structure in which subtraction between exponent data 7 and 9 is performed, mantissa data 8 and 10 are swapped based on the result of subtraction and shifting for position adjustment is performed by right barrel shifter, shifting for position adjustment can be performed at remarkably higher speed by the structure in accordance with the first embodiment.

Namely, by this structure, position adjustment can be performed based on the values of exponents without executing subtraction between exponents, and the swapper, which was necessary in the prior art, can be omitted. Therefore, addition of floating point numbers can be performed at remarkably high speed with simplified circuit structure.

Figure 8:
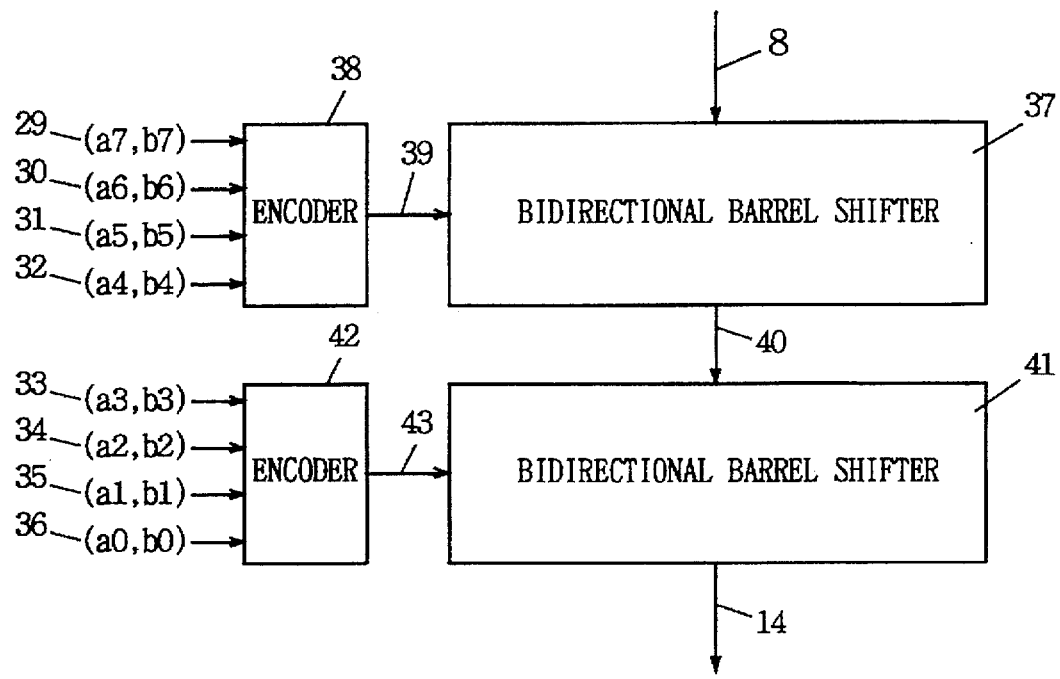
FIG. 8 is a first illustration showing a structure of a bidirectional barrel shifter in accordance with a second embodiment of the present invention.

A second embodiment in which the number of stages of bidirectional shifters is reduced, is shown in FIG. 8. Upper 4 bits of inputs 29 to 36 of the exponents are input to an encoder 38, and a signal corresponding to the values of these 4 bits is output as an encoder output signal 39.

In the example described in the first embodiment above, the upper 4 bits is (1, 0), (0, 1)((1, 1)(0, 1)=1–10–1=3. However, the least significant bit of the higher 5 bits correspond to a digit representing $2^4$, and therefore by multiplying $2^4$, the result would be $3 \times 2^4 = 48$. Namely, a signal which realizes shifting by 48 bits to the left is output as encoder output signal 39.

To an encoder 42, lower 4 bits of the inputs 29 to 36 of the exponents are input, and a signal for shifting in accordance with the values of these 4 bits is output as an encoder output signal 43. In the example described in the first embodiment, lower 4 bits correspond to (0, 1)(0, 0) (1, 1)(0, 1)=–100–1=–9. Therefore, to encoder output signal 43, a signal for shifting by –9 bits, that is, 9 bits in the right is output.

Bidirectional barrel shifter 37 shifts a mantissa input 8 in accordance with the shift signal generated from upper 4 bits, and outputs an output data 40. Further, bidirectional barrel shifter 41 shifts the input 40 in accordance with a shift signal generated from lower 4 bits, and outputs an output data 14. In the example discussed in the first embodiment, input data 8 shifted by 48 bits in the left is output as output data 40, and data 40 shifted by 9 bits in the right is output as output data 14.

Therefore, finally, input data 8 shifted by 48–9=39 bits in the left is output as the output data 14, and thus desired shifting is achieved.

The bidirectional barrel shifters 37 and 41 will be described in greater detail.

Figure 9:
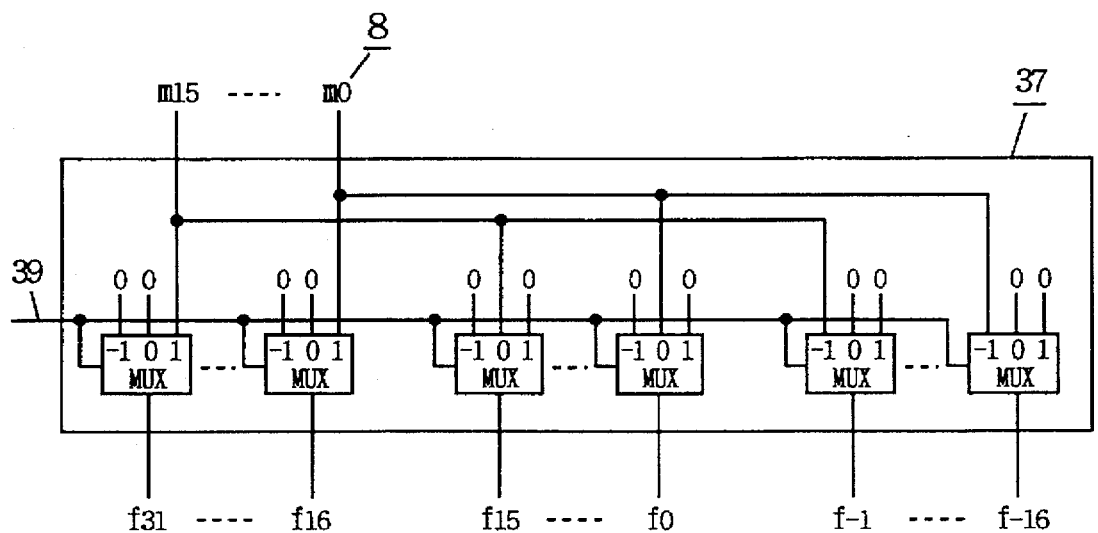
FIG. 9 is a second illustration showing a structure of the bidirectional barrel shifter in accordance with the second embodiment.

FIG. 9 shows a structure of the bidirectional barrel shifter 37 on the upper side in accordance with a second embodiment. Redundant binary numbers 29 to 32 of higher 4 digits are numerized by an encoder 38, and signal 39 has a value within –15 to +15. Here, the redundant binary number further has values 33 to 36 of lower 4 digits. Therefore, the value 1 of signal 39 represents shifting of 16 digits.

Therefore, if the signal 39 is not smaller than 2 or not larger than –2, there is not a possibility that the least significant bit after shifting is within the range of from –15 to +15th digit, regardless of the amount of shifting of lower digits. Therefore, only the cases where signal 39 is 1, 0 or –1 should be considered.

When the signal 39 is 1, $m_{15}$ to $m_0$ are shifted by 16 bits to the left, when it is 0, these are not shifted, and when it is –1, $m_{15}$ to $m_0$ are shifted by 16 bits to the right, and output to $f_{31}$ to $f_{-16}$.

Figure 10:
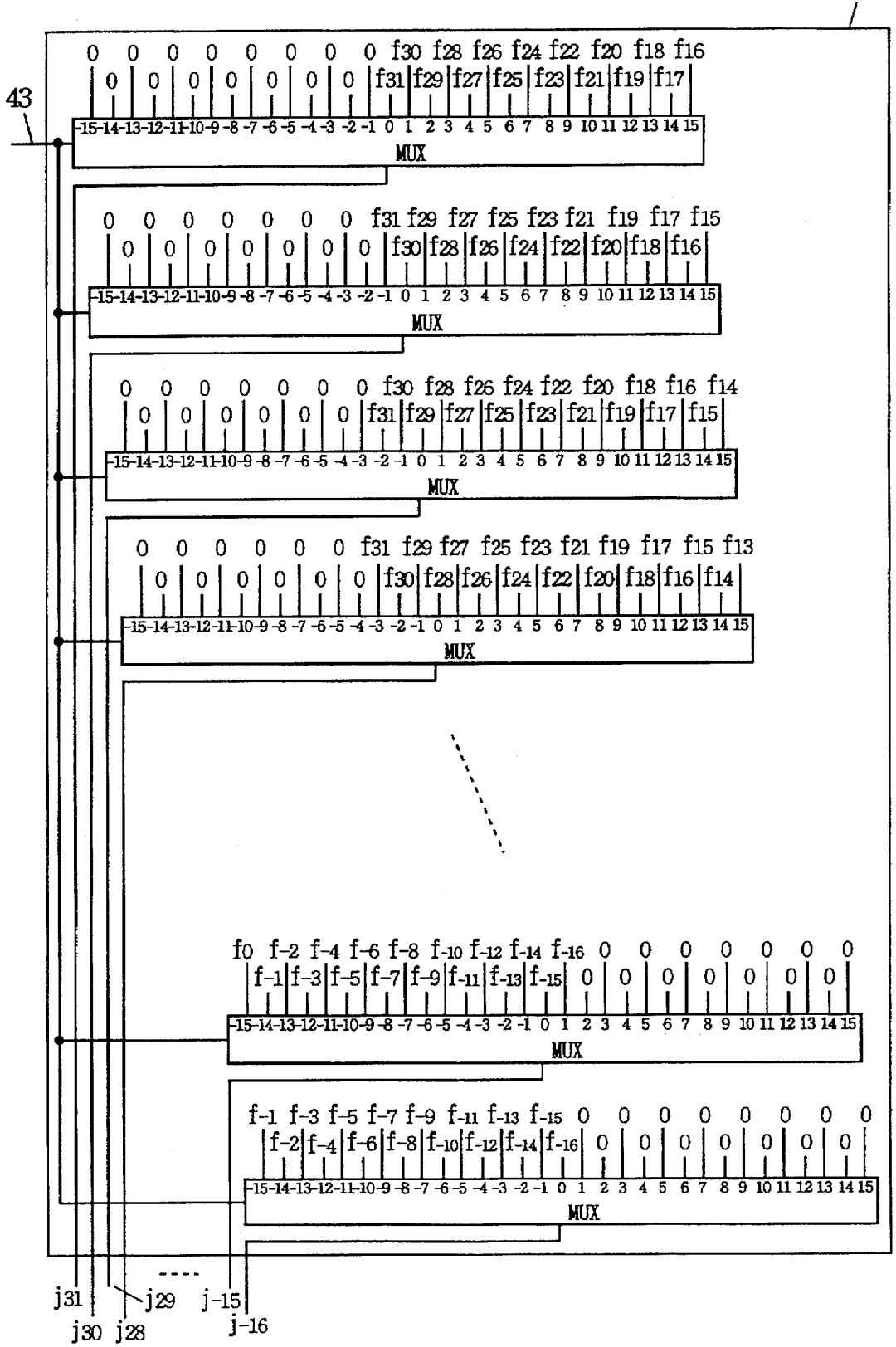
FIG. 10 is a third illustration showing a structure of the bidirectional barrel shifter in accordance with the second embodiment.

FIG. 10 shows a structure of the bidirectional barrel shifter 41 on the lower digit side in accordance with the second embodiment. Redundant binary numbers 33 to 36 of lower 4 digits are numerized by an encoder 42, and an encoder signal 43 has a value of from –15 to +15.

The MUX in the figure represents a multiplexer circuit for selecting one of 31 inputs in accordance with respective values of encoder signal 43. In this example, 48 multiplexers from 31th to 16th digits are arranged, to each of which the encode signal 43 is input. Therefore, input signals $f_{31}$ to $f_{-16}$ are shifted in accordance with the amount of shifting of encode signal 43, and output signals $j_{31}$ to $j_{-16}$ are provided.

Though the exponent input is divided into upper 4 bits and lower 4 bits in this embodiment, the manner of division may be different.

Compared with the first embodiment, in this structure, the number of stages of the bidirectional shifters can be reduced, and therefore, shifting operation at higher speed can be realized.

Figure 11:
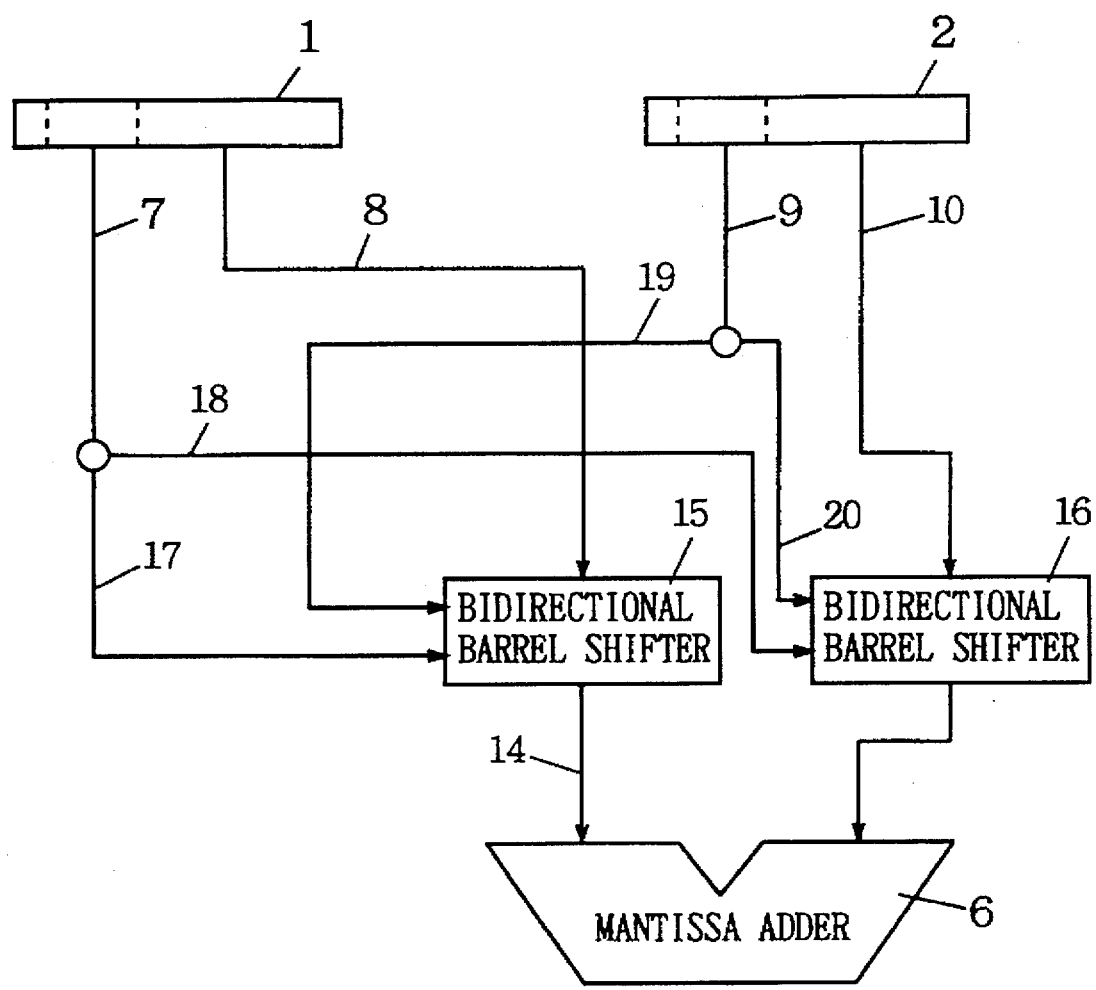
FIG. 11 shows a structure of a shifter in accordance with a third embodiment of the present invention.
Figure 12:
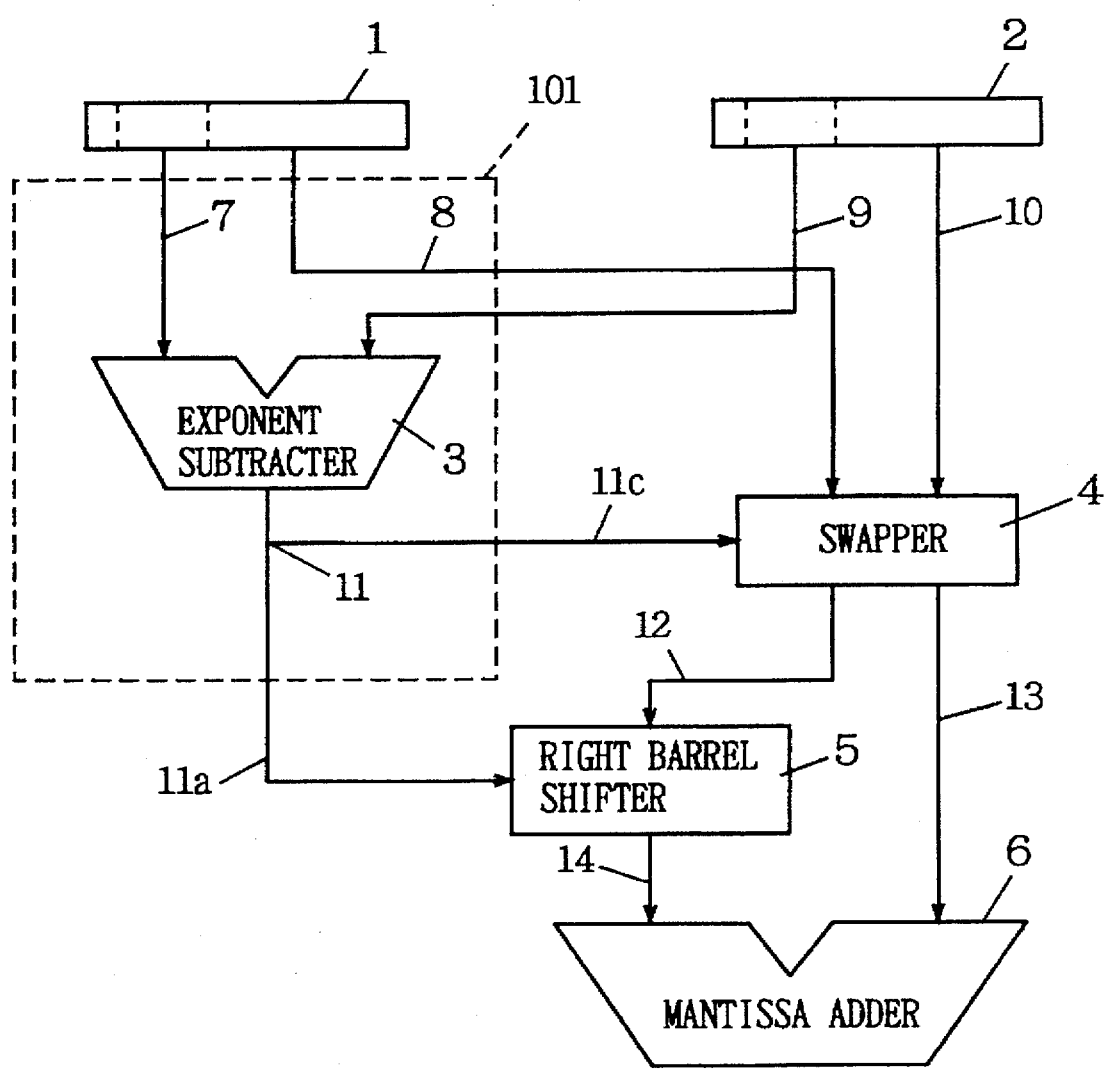
FIG. 12 shows a structure of a conventional shifter.
Figure 13:
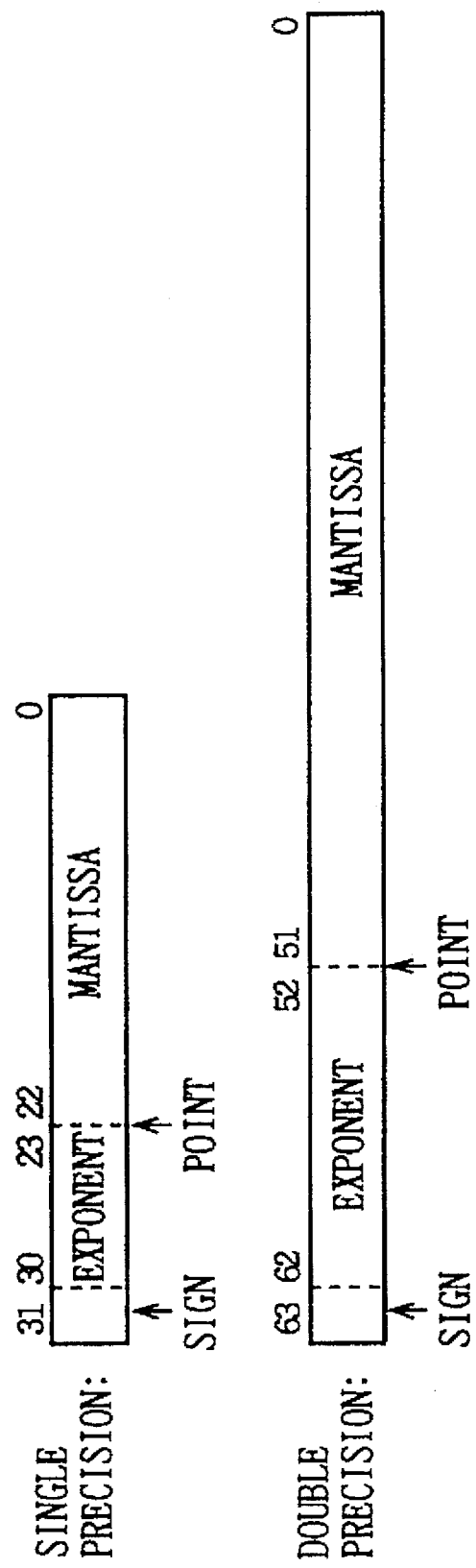
FIG. 13 shows data structure of a floating point number.
Figure 14:
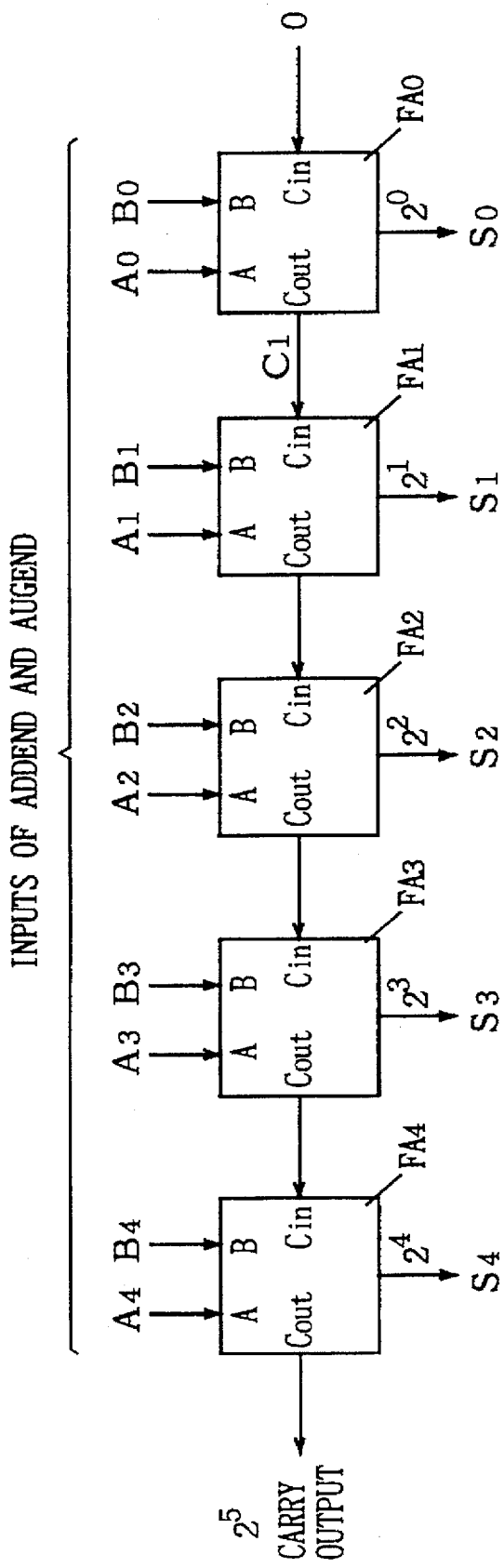
FIG. 14 is a schematic block diagram showing a structure of a parallel adder.
Figure 15:
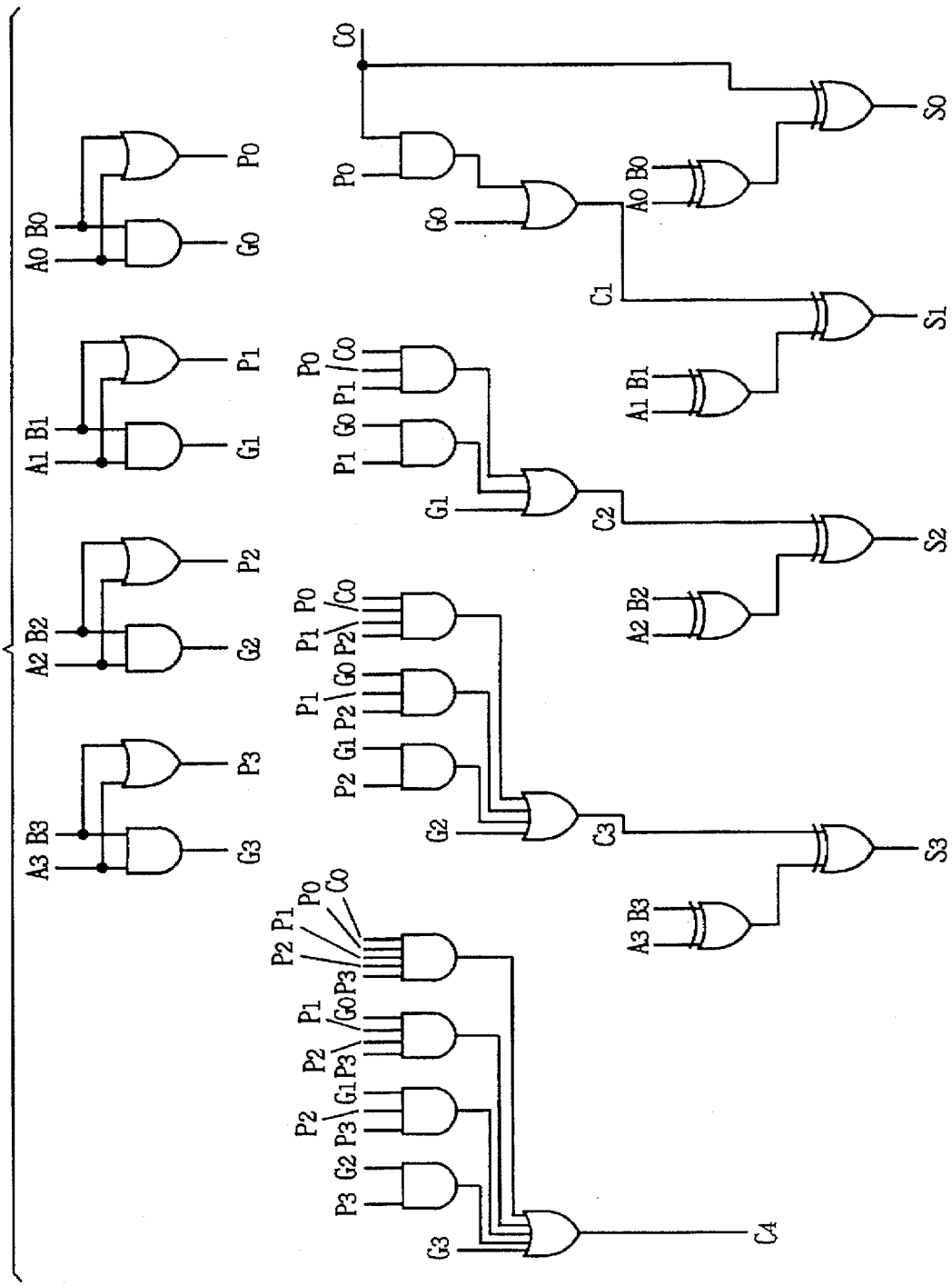
FIG. 15 is a schematic block diagram showing a structure of a carry-look-ahead type adder.

FIG. 11 shows a third embodiment in which a bidirectional barrel shifter 16 is added. In this embodiment, exponents 7 and 9 are each divided into two parts. More specifically, exponent 7 is divided into one part 17 and the other part 18, while exponent 9 is divided into one part 19 and the other part 20, corresponding to exponent 7.

Assume that the parts 17 and 19 correspond to upper 4 digits and parts 18 and 19 correspond to lower 4 digits as in the second embodiment. $B_i$ directional barrel shifter 15 performs shifting in accordance with the value of 4 digits of redundant binary number formed by parts 17 and 19. As discussed in the second embodiment, the value is 48, and therefore shifting to the left by 48 bits is performed. If this value is negative, shifting to the right is performed.

By contrast, bidirectional barrel shifter 16 shifts mantissa of the second floating point number 2 to the right if the redundant binary number formed by parts 18 and 20 is positive and to the left if it is negative. Referring to the example in the first embodiment, parts 17 and 19 are lower 4 digits respectively, and the value is –9 as described in the first embodiment. Therefore, bidirectional barrel shifter 16 performs shifting by 9 bits to the left. As a result, the output 14 from bidirectional barrel shifter 15 comes to be shifted by 39 bits in the right with respect to the result of shifting 6, and thus desired shifting is realized.

Though exponent parts 7 and 9 are divided into upper 4 bits and lower 4 bits, respectively, the manner of division may be different.

The bidirectional barrel shifters 15 and 16 may be the type shifting bit by bit as shown in FIG. 3, or they may be utilize encoding, as shown in FIG. 8.

By this structure, the number of stages of the barrel shifter can further be reduced, and position adjustment at higher speed is realized.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. For first to fourth numbers represented in binary notation, a shifter having a function of shifting either the third or fourth number in accordance with a difference obtained by subtracting the second number from the first number, comprising:

first to fourth storing means for storing said first to fourth numbers, respectively; and a plurality of serially connected shifting means receiving either one of said third and fourth numbers as an input for successively shifting, each of said shifting means including a first input end to which a number to be shifted is input, a second input end to which at least a pair of bit data of mutually corresponding digits of said first and second numbers are input, a plurality of shift circuits, each having a fixed amount of shifting corresponding to a difference between bits of a group of bit data pairs input to said second input end with said difference between bits of each of said bit data pairs regarded as a redundant binary number, and an output end for outputting a result of shifting of the input number from said first input end, by selected one of said shift means having fixed amount of bits for shifting.

2. The shifter according to claim 1, wherein said first and second numbers are each a binary number of n digits;

said shifting means includes n shifting means connected in series, ith one of said shifting means receives a pair ($a_i$, $b_i$) of bit data $a_i$ of ith digit of said first number and $b_i$ of ith digit of said second number as an input at said second input end, said ith one of said shifting means including a first shift circuit, for shifting an input number by $2^{i-1}$ bits in a first direction, a second shift circuit not performing shifting, and a third shift circuit, for shifting input number by $2^{i-1}$ bits in a second direction.

3. The shifter according to claim 1, wherein said first number is an exponent of a first floating point number, said second number is an exponent of a second floating point number, said third number is a mantissa of the first floating point number and said fourth number is a mantissa of the second floating point number.

4. An adder receiving first and second floating point numbers as inputs and outputting result of addition, comprising:

(a) first floating point number storing means receiving externally as an input and storing a first floating point number;

(b) second floating point number storing means receiving externally as an input and storing a second floating point number; wherein said first floating point number storing means includes first and second storing means for storing a first exponent and a first mantissa of said first floating point number as binary numbers, respectively, said second floating point number storing means includes third and fourth storing means for storing a second exponent and a second mantissa of said second floating point number as binary numbers respectively; said shifter further comprising (c) a shifter for shifting either one of said first and second mantissas in accordance with a difference between said first exponent and said second exponent, said shifter including a plurality of serially connected shifting means receiving as an input either one of said first and second mantissas stored in said second and fourth storing means respectively for successively shifting, each said shifting means having a first input end to which a number to be shifted is input, a second input end to which at least a pair of bit data of mutually corresponding digits of said first and second exponents stored in said first and third storing means respectively is input, a plurality of shift circuits, each having a fixed amount of shifting corresponding to a difference between bits of a group of bit data pairs input to said second input end with said difference between bits of each pair of said bit data regarded as a redundant binary number, and an output end for outputting result of shifting of the input number from said first input end by selected one of said shift circuits; and (d) adder means receiving the output from said shifter and either said first or second mantissa not input to said shifter, for performing addition.

5. For first to fourth numbers represented in binary notation, a shifter having a functioning of shifting either the third or fourth number in accordance with a difference obtained by subtracting the second number from the first number, comprising:

first to fourth storing means for storing said first to fourth numbers, respectively;

a plurality of serially connected shifting means receiving one of either said third and fourth numbers as an input for successively shifting, each of said shifting means including a first input end to which a number to be shifted is input, a second input end to which a number corresponding to an amount of shifting is input, encoding means to which at least two pairs of bit data of mutually corresponding digits of said first and second numbers are input, for encoding amounts of shifting represented by a difference between said mutually corresponding digits of each bit data pair with the difference regarded as a redundant binary number, shift circuits each for shifting a fixed amount corresponding to said amounts of shifting generated by said encoding means, and an output end for outputting result of shifting of the input number from said first input end by that shift circuits having fixed amount of bits for shifting which corresponds to the result of encoding by said encoding means.

6. The shifter according to claim 5, wherein said first number is an exponent of a first floating point number, said second number is an exponent of a second floating point number, said third number is a mantissa of the first floating point number and the fourth number is a mantissa of the second floating point number.

7. An adder receiving first and second floating point numbers as inputs for outputting a result of addition, comprising:

(a) first floating point number storing means receiving externally as an input and storing a first floating point number;

(b) second floating point number storing means receiving externally as an input and storing a second floating point number; wherein said first floating point number storing means includes first and second storing means for storing a first exponent and a first mantissa of said first floating point number as binary numbers respectively, and said second floating point number storing means includes third and fourth storing means storing a second exponent and a second mantissa of said second floating point number as binary numbers, respectively;

(c) a shifter for shifting either one of said first and second mantissas in accordance with a difference between said first exponent and said second exponent, said shifter including a plurality of serially connected shifting means receiving as an input either one of said first and second mantissas stored in said second and fourth storing means respectively for successively shifting, each said shifting means having
a first input end to which a number to be shifted is input,
a second input end to which a number corresponding to an amount of shifting is input,
encoding means to which at least two pairs of bit data of mutually corresponding digits of said first and second exponents stored in said first and third storing means are input for encoding amounts of shifting represented by a difference between said mutually corresponding digits of each bit data pair, with said difference regarded as a redundant binary number,
shift circuits each for shifting a fixed amount corresponding to the amounts of shifting generated by said encoding means, and
an output end for outputting result of shifting of the input number from said first input end by that shift circuits which corresponds to the result of encoding by said encoding means; and
(d) adder means receiving the output from said shifter and either one of first and second mantissas which is not input to said shifter, for performing addition.

8. For first to fourth numbers represented in binary notation, a shifter having a function of shifting third and fourth numbers in accordance with a difference obtained by subtracting the second number from the first number, comprising:
first to fourth storing means for storing said first to fourth numbers, respectively;
bit data distributing means for distributing pairs of bit data of mutually corresponding digits of said first and second numbers to first and second groups of bit data pairs; and
a first group of a plurality of shifting means serially connected to each other, receiving as an input said third number for successively shifting,
each of said shifting means of the first group including
a first input end to which the number to be shifted is input,
a second input end to which one subgroup of said first group of bit data pairs is input,
shift circuits each for shifting a fixed amount corresponding to an amount of shifting represented by a difference between bits of said bit data pairs of said subgroup with said difference regarded as a redundant binary number, said each shift circuit performing position shifting in a first direction when said amount of shifting is positive and in a second direction when said amount of shifting is negative, and
an output end for outputting result of shifting of the input number from said first input, by one of said shift circuits selected corresponding to the input data of said second input end; and
a second group of two or more shifting means connected in series to each other, receiving as an input said fourth member for successively shifting, each of the shifting means of said second group receiving one subgroup of said second group of bit data pairs, and having an opposite relation between positive/negative sign of the amount of shifting and direction of shifting, compared to that of said first group of shifting means.

9. The shifter according to claim 8, wherein
said first number is an exponent of a first floating point number, said second number is an exponent of a second floating point number, said third number is a mantissa of the first floating point number and said fourth number is a mantissa of the second floating point number.

10. An adder receiving first and second floating point numbers as inputs and outputting result of addition, comprising
(a) first floating point number storing means for receiving externally as an input and storing a first floating point number;
(b) second floating point number storing means for receiving externally as an input and storing a second floating point number; wherein
said first floating point number storing means includes first and second storing means for storing a first exponent and a first mantissa of said first floating point number as binary numbers respectively, and
said second floating point number storing means includes third and fourth storing means for storing a second exponent and a second mantissa of said second floating point number as binary numbers respectively; said adder further comprising
(c) a shifter for shifting said first and second mantissas in accordance with a difference between said first exponent and said second exponent,
said shifter including
(c-1) bit data distributing means for distributing bit data pairs of mutually corresponding digits of the first and second exponents stored in said first and third storing means to first and second groups of bit data pairs,
(c-2) a first group of a plurality of shifting means connected in series, receiving as an input the first mantissa stored in said second storing means for successively shifting,
each of the shifting means of said first group including
a first input end to which the number to be shifted is input,
a second input end to which one subgroup of said first group of bit data pairs is input,
shift circuits each for shifting a fixed amount corresponding to an amount of shifting represented by a difference between bits of said bit data pairs of said subgroup with said difference regarded as a redundant binary number, said each shift circuit performing position shifting in a first direction when said amount of shifting is positive, and in a second direction when said amount of shifting is negative, and
an output end for outputting result of shifting of the input number from said first input, by one of said shift circuits having fixed amounts of bits for shifting selected corresponding to the input data of said second input end, and
(c-3) second group of two or more shifting means connected in series receiving as an input the second mantissa stored in said fourth storing means for successively shifting,
each of said second group of shift circuits receives as an input one subgroup of said second group of bit data pairs, and having an opposite relation between positive/negative sign of the amount of shifting and direction of shifting, compared to that of said first group of shifting means; and
(d) adder means receiving an output from said shifter for performing addition.

* * * * *